United States Patent [19]

Zimmermann et al.

[11] Patent Number: 4,635,498
[45] Date of Patent: Jan. 13, 1987

[54] FASTENING DEVICE

[75] Inventors: Klaus Zimmermann, Loerzweiler, Fed. Rep. of Germany; Michael J. Thomas; Norman R. Bailey, both of Lockport, N.Y.

[73] Assignee: General Motors Corporation, Detroit, Mich.

[21] Appl. No.: 724,589

[22] Filed: Apr. 18, 1985

[51] Int. Cl.⁴ .............................................. F16C 1/10
[52] U.S. Cl. .................................. 74/501 R; 248/74.1; 248/74.3
[58] Field of Search ............................. 74/501, 501 D; 248/74.1, 74.3

[56] References Cited

U.S. PATENT DOCUMENTS

| | | | |
|---|---|---|---|
| 1,453,426 | 5/1923 | Williams | 114/101 |
| 2,186,601 | 1/1940 | Borkenstein | 339/188 C |
| 3,263,520 | 8/1966 | Tschantz | 264/278 |
| 4,294,133 | 10/1981 | Hurley | 24/528 |
| 4,339,213 | 7/1982 | Gilmore | 248/74.1 |

FOREIGN PATENT DOCUMENTS 2040383  8/1980  United Kingdom ................. 74/501

Primary Examiner—Albert J. Makay
Assistant Examiner—David W. Westphal
Attorney, Agent, or Firm—R. L. Phillips

[57] ABSTRACT

A fastening device is disclosed comprising a first fastener member adapted to be fixed to a sheath and a second fastener member adapted to be fixed to a support. One of the fastener members has a semi-cylindrical socket and the other fastener member has a cylindrical body adapted to engage the socket and be supported thereby for rotary movement. Axial retention means on the cylindrical body and socket prevent their relative axial movement while detent means also thereon engage with each other upon relative rotary movement therebetween and thereafter yieldingly prevent such relative rotary movement therebetween while holding the cylindrical body in the socket.

3 Claims, 3 Drawing Figures

FASTENING DEVICE

TECHNICAL FIELD

This invention relates to fastening devices and more particularly to fastening devices for attaching a bowden wire or cable sheath and the like in place.

BACKGROUND OF THE INVENTION

In the fastening of bowden wire or cable sheaths and the like to a support or other device, it is common practice to employ a clamp or bracket requiring separate fasteners and the associated assembly tool(s) therefor. This represents a significant cost in mass production as to both the numerous parts and their assembly time. Furthermore, the installation may make accessibility to the fastening arrangement difficult or even impossible requiring an undesirable alternative mounting arrangement.

SUMMARY OF THE INVENTION

The present invention offers a simple two-part structural solution to these problems wherein a first fastener member is provided that is adapted to be formed integral with a bowden wire or cable sheath and a second fastener member is provided that is adapted to be formed integral with a support member or other device. One of the fastener members is formed with a semi-cylindrical socket while the other fastener member is formed with a cylindrical body that is adapted to engage in the socket and be supported thereby for rotary movement. The cylindrical body and socket are then further formed with a collar and groove arrangement so as to prevent their relative axial movement and in addition are formed with a flexibly supported pawl detent arrangement which engages upon their relative rotary movement and thereafter yieldingly prevents such movement and tightly maintains the fastener members together to thereby fasten the sheath to the support.

These and other objects, advantages and features of the present invention will become more apparent from the following description and accompanying drawing in which:

DETAILED DESCRIPTION OF THE PREFERRED EMBODIMENT

Figure 1:
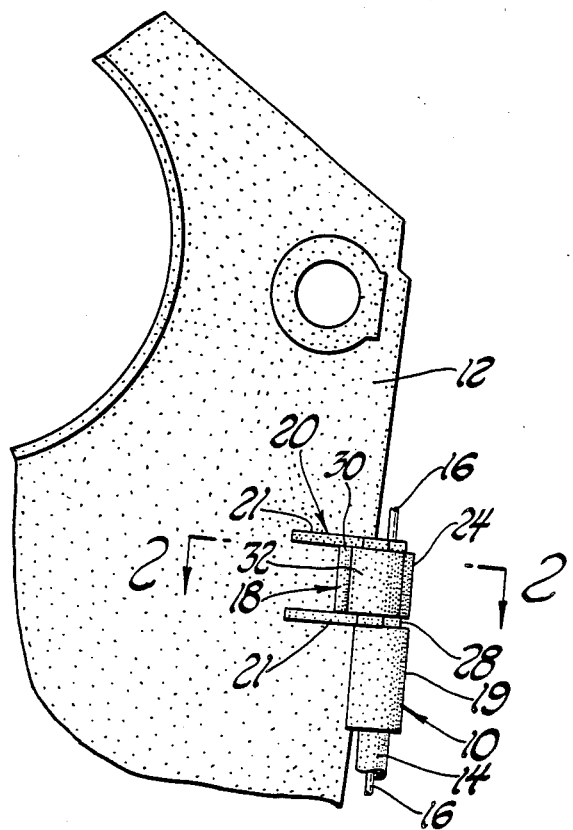
FIG. 1 is a plan view of the preferred embodiment of the fastening device of the present invention as adapted to fasten a bowden wire sheath in a vehicle heating and air conditioning control system.

Referring to the drawing, there is shown one end of a bowden wire assembly 10 used to operate an air valve (not shown) in a vehicle air conditioning and heater system and which for that purpose this one end of the bowden wire assembly requires mounting or support on a plastic case 12 forming a part of the heating and air conditioning system. In the bowden wire assembly 10, there is a plastic sheath 14 in which a wire 16 is slidably mounted and remotely controlled at one end such as by a hand lever, not shown, to operate the air valve by connection of such wire at the other end thereto.

Figure 2:
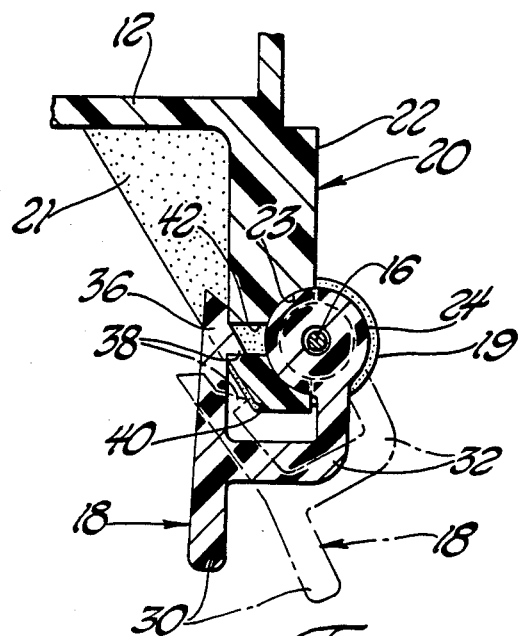
FIG. 2 is an enlarged sectional view taken along the line 2—2 in FIG. 1.
Figure 3:
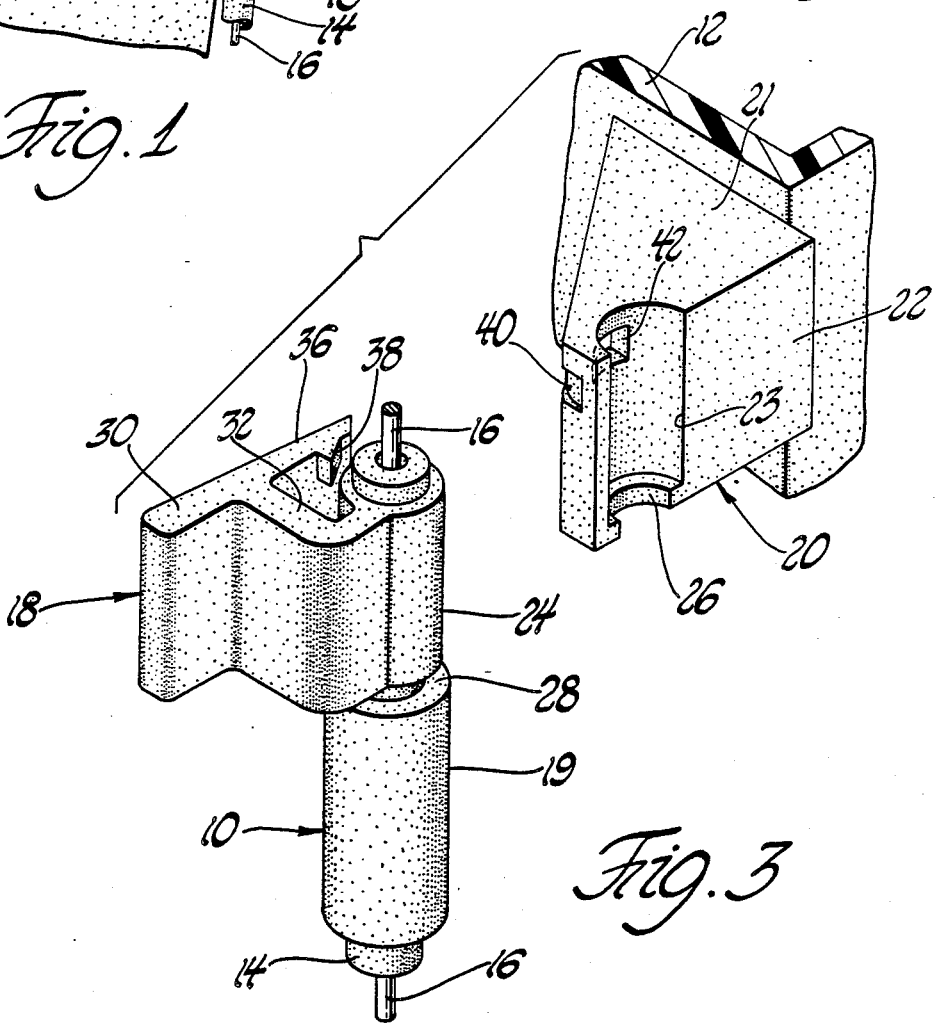
FIG. 3 is an enlarged exploded view of the fastening device in FIG. 1.

Describing now the fastening device for fastening the bowden wire sheath 14 to the case 12, there is provided a first fastener member 18 which is molded integral with an enlarged diameter end 19 of the sheath 14 and a second fastener member 20 which is formed integral with the plastic case 12. The integral case fastener member 20 is formed with a pair of parallel, triangular shaped legs 21 which are joined at their feet to the case and are interconnected at their other end by a span 22 in which is formed a semi-cylindrical socket 23. The sheath fastener member 18 on the other hand is formed about the wire 16 with a cylindrical body 24 which is adapted to engage with the socket and be supported thereby for rotary movement about the bowden wire axis as best seen in FIG. 2. In addition, the fastener member 20 is formed at the lower end of the socket 23 as seen in FIG. 3 with a semi-cylindrical, radially inwardly projecting retaining collar 26 which is received or captured in an annular retaining groove 28 formed in the other fastener member 18 between the two cylinders 19 and 24 so that on assembly of these two fastener parts they are then prevented from relative axial movement but not from relative rotary movement.

With the cylindrical body 24 of the fastener member 18 so received in the socket 23 and prevented from relative axial movement by the cooperation between the semi-cylindrical collar 26 in the groove 28, the cylindrical body is then adapted to be rotated within the socket by a person grasping and applying tangential force to an end 30 of a double right-angle pivot arm 32 formed integral with and of the same axial extent as this body. An arm portion 36 that is formed integral with and extends in the opposite direction as the lever arm end 30 is adapted upon rotary clockwise movement of the cylindrical body as viewed in FIG. 2 to then assume a position wherein the span 22 with the socket 23 is sandwiched between the cylindrical body 24 and the latter's integral arm portion 37. Moreover, a pawl 38 formed on the underside of the arm portion 36 is caused to engage a ramped groove or notch 40 in the backside of the socket 23 as this rotary movement of the cylindrical body occurs causing the arm to deflect radially outward as shown in phantom line in FIG. 2. Then on continued rotary cylindrical body movement, the pawl leaves the ramp and aligns with a detent hole 42 in the socket wall whereon the deflected arm attempts to regain its unflexed position while forcibly snapping the pawl into this detent hole. By design, the dimensions of this detent arrangement prevent the arm 36 from completely unflexing so as to tightly hold the fastener member 18 in the socket of the other fastener member 20 as best seen in FIG. 2. Moreover, it will be appreciated that the fastening device also provides for quick disconnect in that a person need simply grasp the end 30 of the flexible arm 36 and force it counterclockwise as viewed in FIG. 2 until the pawl clears the detent hole. Thereafter, the cylindrical body may then be relatively freely turned until the detent arm completely clears the socket backside and permits removal of the cylindrical body from the socket.

Thus, it will be appreciated that the fastening device of the present invention in its preferred embodiment need comprise only two fastener parts both of which may be molded or formed integral with the sheath and the support or other associated device where their materials are compatible. It will also be understood that one or more other fastening devices like that described above may be similarly used to attach this same sheath at other places along its length including at its other end which is not shown. Furthermore, it will be understood that the fastening device is adaptable to other devices like a bowden wire or cable sheath which before were fastened by a clamp or bracket or the like.

Thus the preferred embodiment is intended to be illustrative of the invention which may be modified within the scope of the appended claims.

The embodiments of the invention in which an exclusive property or privilege is claimed are defined as follows:

1. A fastening device for fastening a bowden wire or cable sheath and the like to a support, said device comprising a first fastener member adapted to be fixed to the sheath and a second fastener member adapted to be fixed to the support, one of said fastener members having a semi-cylindrical socket, the other of said fastener members having a cylindrical body adapted to engage said socket and be supported thereby for rotary movement, axial retention means on said cylindrical body and socket for preventing relative axial movement therebetween, and detent means on said cylindrical body and socket for self forcibly snap fittingly engaging with each other in a radial direction upon relative rotary movement between said cylindrical body and socket and thereafter yieldingly holding said cylindrical body in said socket and preventing such relative rotary movement therebetween.

2. A two-piece fastening device for fastening a bowden wire or cable sheath and the like to a support, said device comprising a first fastener member formed integral with the sheath and a second fastener member formed integral with the support, said second fastener member having a semi-cylindrical socket, said first fastener member having a cylindrical body adapted to engage said socket and be supported thereby for rotary movement, axial retention means formed integral with said cylindrical body and socket for preventing relative axial movement therebetween, and detent means formed integral with said cylindrical body and socket for self forcibly snap fittingly engaging with each other in a radial direction upon relative rotary movement between said cylindrical body and socket and thereafter yieldingly holding said cylindrical body in said socket and preventing further relative rotary movement therebetween.

3. A two-piece fastening device for fastening a bowden wire or cable sheath and the like to a support, said device comprising a first fastener member adapted to be fixed to the sheath and a second fastener member adapted to be fixed to the support, one of said fastener members having a semi-cylindrical socket, the other of said fastener members having a cylindrical body adapted to engage said socket and be supported thereby for rotary movement, axial retention means on said cylindrical body and socket in the form of a collar on one part receivable in a groove on the other part for preventing relative axial movement therebetween, and detent means on said cylindrical body and socket in the form of a flexible arm with a pawl on one part, said arm extending outward and partially about said one part so as to be deflectable to self snap fittingly engage said pawl in a radially facing hole on the other part on their relative rotary movement for yieldingly holding said cylindrical body in said socket and preventing further relative rotary movement therebetween.

* * * * *